Dec. 8, 1931.   R. H. SMITH ET AL   1,835,910
BOLT MAKING MACHINE
Filed Nov. 14, 1928   13 Sheets-Sheet 8

INVENTORS
Roy H. Smith
Lee A. Frazer
Kwis Hudson & Kent
ATTORNEYS

Dec. 8, 1931.  R. H. SMITH ET AL  1,835,910
BOLT MAKING MACHINE
Filed Nov. 14, 1928   13 Sheets-Sheet 10

INVENTORS
Roy H. Smith
Lee A. Frayer
BY Kivns Hudson & Kent
ATTORNEYS

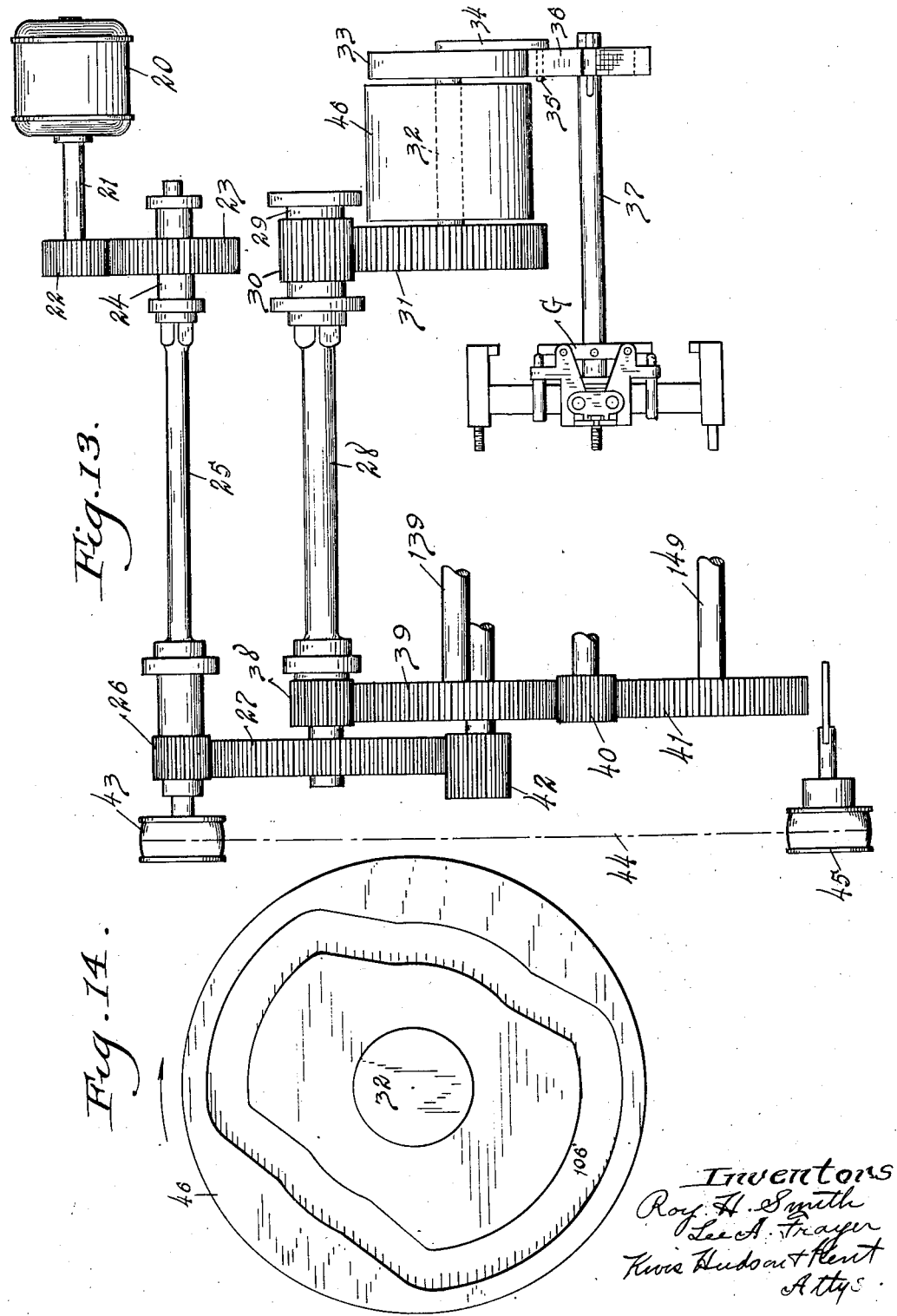

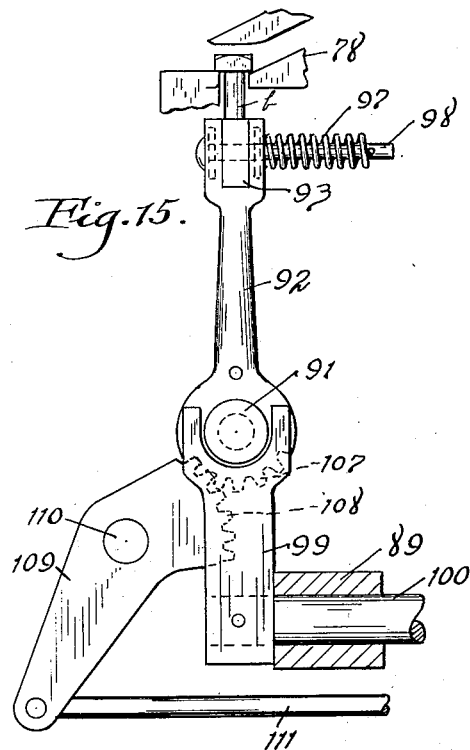
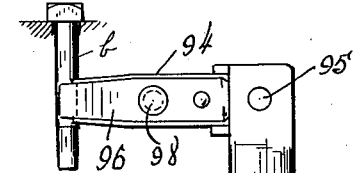
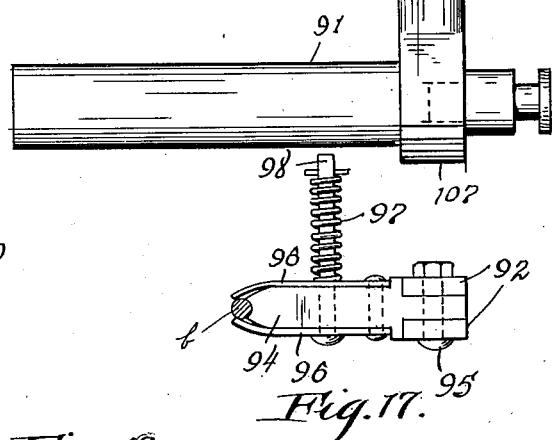
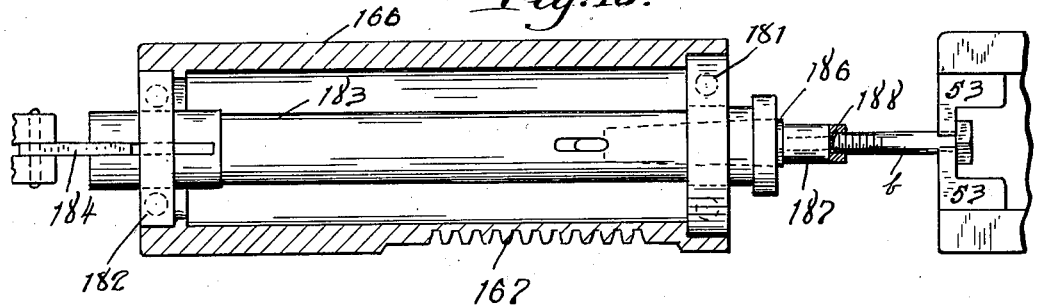
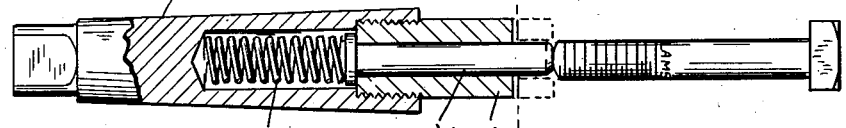

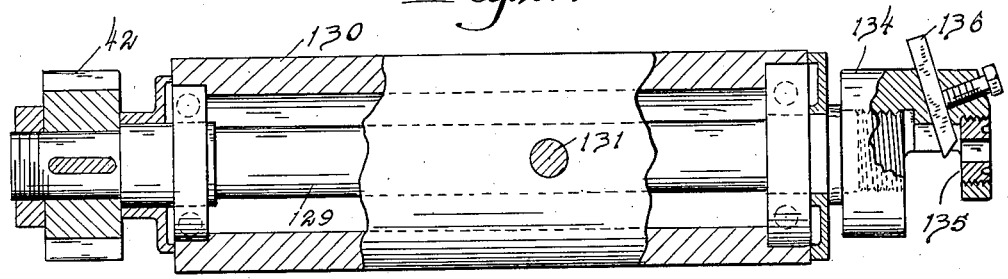
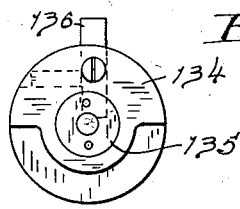
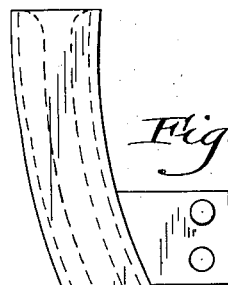
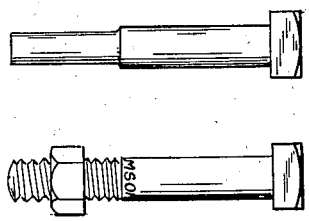
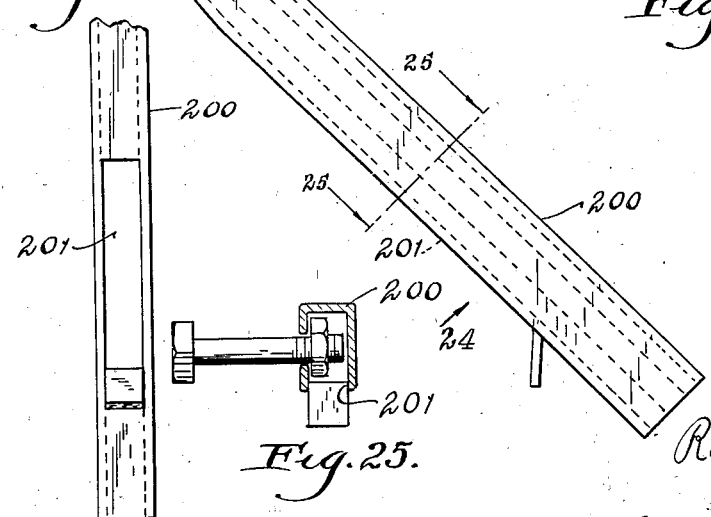

Patented Dec. 8, 1931

1,835,910

UNITED STATES PATENT OFFICE

ROY H. SMITH AND LEE A. FRAYER, OF KENT, OHIO; SAID FRAYER ASSIGNOR TO SAID SMITH

BOLT MAKING MACHINE

Application filed November 14, 1928. Serial No. 319,334.

This invention relates to bolt making machines, particularly machines operating automatically to trim or point the end of the blank, rolling a thread therein, and applying a nut thereto.

One of the objects of the invention is the provision of a machine of the class described, by the use of which the labor required for producing complete bolt and nut assemblies is materially lessened.

Another object is the provision of special novel means for performing the operations respectively of transferring bolt blanks one at a time from a chute to a bolt holder or vise, causing the vise to travel step by step so as to present the bolt to the various stations of the machine in proper order, pointing the bolt, rolling identifying or other marks into the shank of the bolt, rolling a thread into the shank of the bolt, applying a nut to the bolt, and discharging the nut and bolt assemblies into a suitable container.

Other objects and features of novelty will appear as we proceed with that embodiment of the invention which, for the purposes of the present application, we have illustrated in the accompanying drawings, in which:

Fig. 11 is an end view of one of the bolt holders or vises.

Fig. 12 is a detail view, partly broken away, showing a bolt holder presenting a bolt to the bolt pointing tool.

Fig. 13 is a diagrammatic view of the principal power connections of the machine.

Fig. 14 is an end view of the cam cylinder.

Fig. 15 is a fragmental detail view of the transfer finger and its operating mechanism.

Figs. 16 and 17 are side and top plan views of the same.

Fig. 18 is a detail view, partly in vertical section of the nut driving or "nutting" mechanism.

Fig. 19 is a detail sectional view on a larger scale of a portion of the mechanism illustrated in Fig. 18.

Fig. 20 is a sectional view taken on line 20—20, Fig. 19.

Fig. 21 is a view partly in side elevation and partly in section of the bolt pointing mechanism.

Fig. 22 is an end view of the same.

Fig. 23 is a side elevational view of the delivery chute.

Fig. 24 is a fragmental view of the same looking in the direction of arrow 24 in Fig. 23.

Fig. 25 is a cross-section on line 25—25 of Fig. 23, showing a bolt and nut assembly traveling through the chute.

Figs. 26 and 27 are views of the bolt blank and of the completed bolt and nut assembly, respectively.

Similar reference characters refer to like parts throughout the views.

Figure 1:
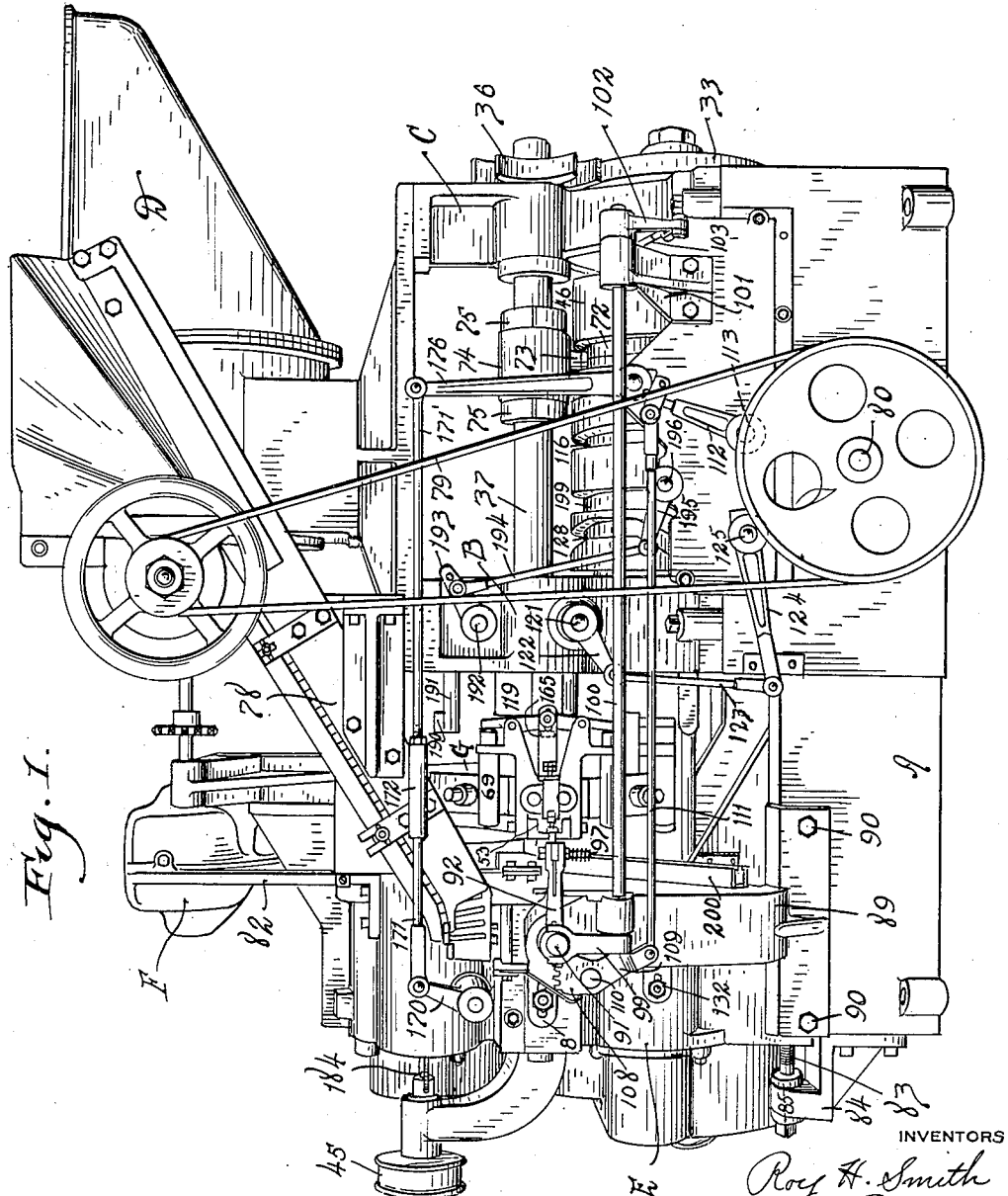
Figure 1 is an elevation in perspective of the front side of the machine.
Figure 2:
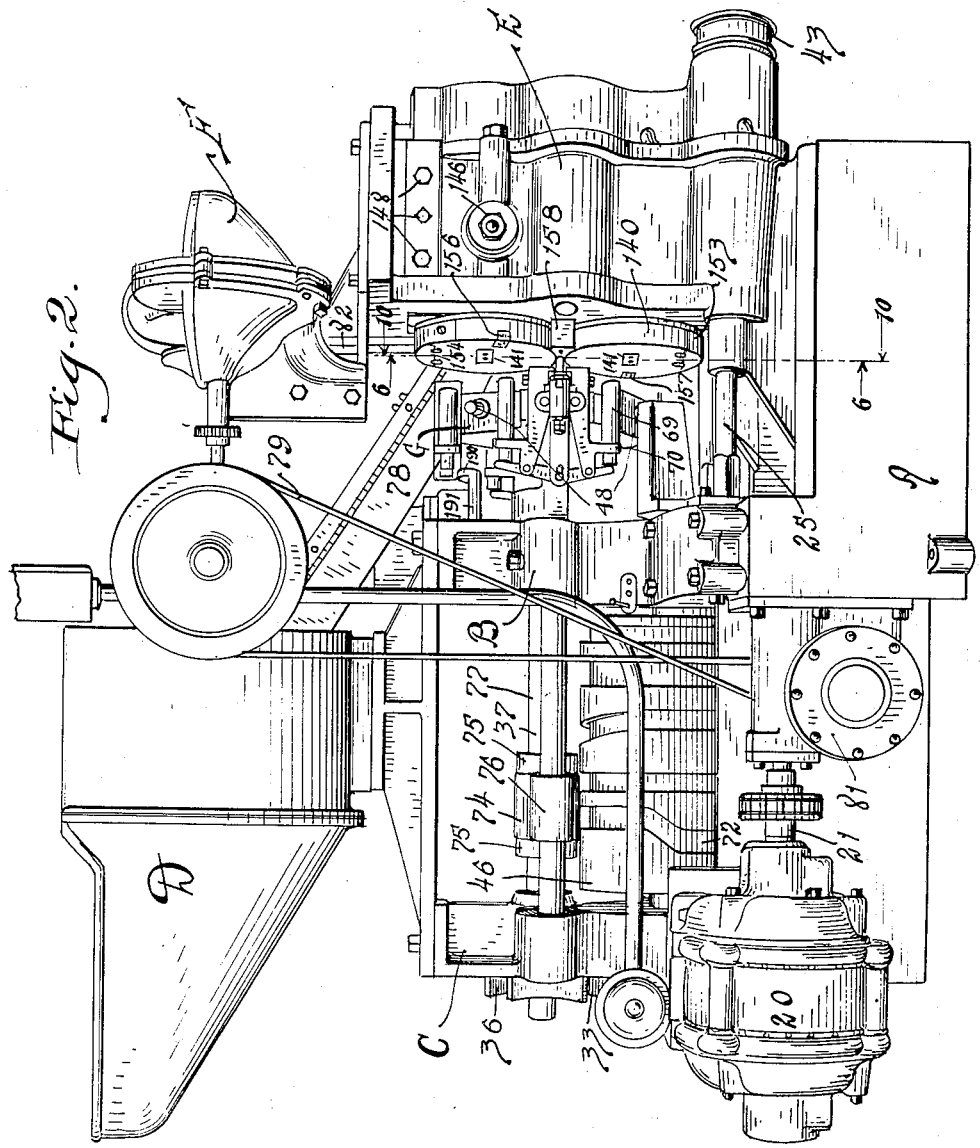
Fig. 2 is a similar elevational view of the rear side of the machine.

In the drawings, the bed of the machine is shown at A. Upon the bed A at an intermediate position, there is secured a transverse frame or standard B, and at the foot of the machine, there is a similar frame member C. The frame members B and C carry a bolt blank hopper D. The head E of the machine is mounted in the bed A and has a slide adjustment lengthwise of the machine. This head E carries the nut hopper F. The other principal parts of the machine are the work holding turret G and four stations carried by the head E, that is to say, first the turret loading station where the bolts are taken from a chute and placed in the bolt holders of the turret; second the bolt pointing station; third the bolt marking and threading station; and fourth the nut driving or "nutting" station where the completed bolt or nut assemblies are discharged. These stations are arranged 90° apart on a circle around the axis of the turret G. After work is performed simultaneously at the various stations, the turret moves backwardly, rotates 90° and then moves forwardly again for the next set of operations to be performed. A completed bolt and nut assembly is, therefore, discharged for each reciprocation of the turret.

Power for operating the machine may be supplied by an electric motor 20, or other prime mover, which drives the shaft 21. The diagram of Figure 13 will be of assistance in following the driving connections now to be described, the relations of which it would be difficult to illustrate completely in any other way. In this figure, the spacing illustrated is sometimes vertical and sometimes horizontal. Upon the shaft 21 there is a pinion 22 which meshes with a gear 23 on a sleeve 24 (see Figs. 8 and 13), which has a squared inner surface for cooperation with the squared end of a shaft 25 that is slidable in the sleeve 24, being rotatably supported at its other end in the slidable head E of the machine. Forward of its bearing in the head E, the shaft 25 carries a pinion 26 which meshes with a gear 27, the latter being mounted upon a shaft 28 which also has bearing in the head E and is likewise squared at its opposite end for slidable driving connection with a sleeve 29 upon which is carried a small gear 30 that meshes with a large gear 31 on shaft 32. The latter carries a notched disk 33 on its outer end, and a crank 34 having a pin 35 in its outer extremity which runs in the radial slots of a star wheel 36, the latter being formed with convex curves on its perimeter which ride on the smooth perimeter of the disk 33. The star wheel 36 is splined onto a shaft 37 upon which the turret G is mounted. The spline connection permits the shaft 37 to move lengthwise without disturbing the plane of rotation of the star wheel. It will be noted that there is thus provided a very considerable reduction in speed between the motor shaft and the shaft 32, the latter turning in practice about one revolution per second.

The shaft 28, in addition to the gear 27, also carries a pinion 38, and this pinion meshes with a gear 39 which works through an idler 40 to drive another gear 41, the gears 39 and 41 being of the same size and rotating in the same direction. The gear 27 meshes with a pinion 42 that drives the pointing tool hereinafter described. On the extreme end of shaft 25, there is a pulley 43 which operates through a belt 44 to drive a pulley 45, by means of which the "nutting" spindle is actuated, as will be later described. On the shaft 32 between the frame members B and C, there is a large cam cylinder 46 in which are cut the cams that control many of the movements of the machine.

Referring now to the turret G, this comprises an octagonal casting 47 which is keyed to the forward end of the shaft 37. On alternate faces of this casting are supported four bolt holders, while from the intermediate faces, there extend four bosses in which are mounted hardened pins 48 that are adapted to register, one after the other, with a hardened guide 49 mounted in a bracket 50 which is bolted to the frame member B, the bracket 50 having a central opening therein which surrounds the shaft 28. Accurate alignment of the bolt holders at each reciprocation of the turret is therefore assured, and if looseness develops after long use, new parts 48 and 49 may be inserted.

Figure 9:
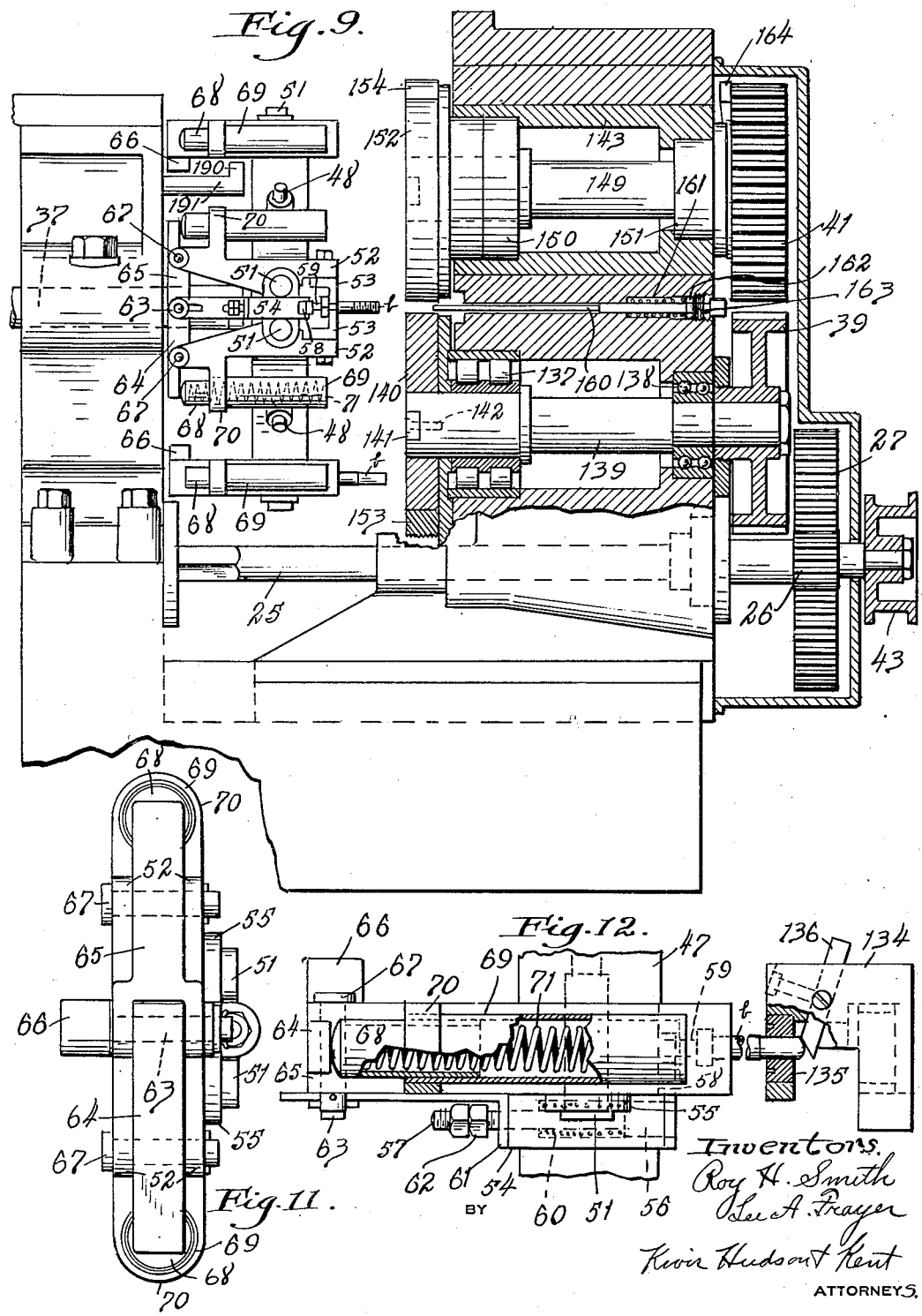
Fig. 9 is an elevational view partly in section on the line 9—9, Fig. 6.
Figure 10:
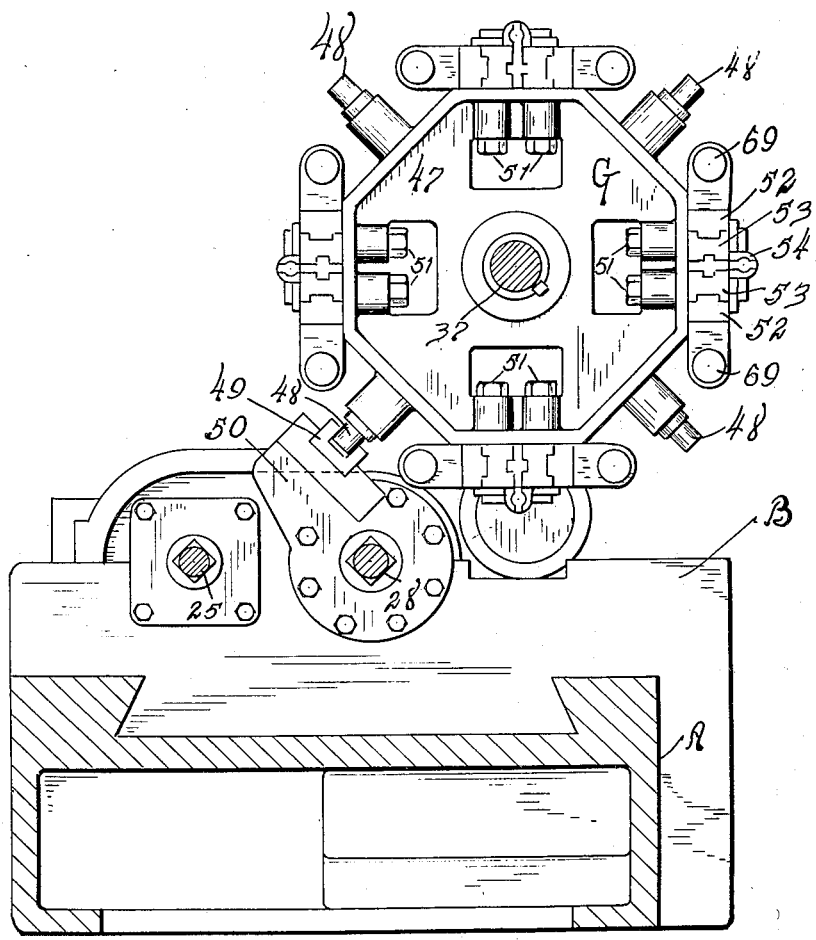
Fig. 10 is a transverse vertical sectional view taken substantially on the line 10—10, Fig. 2, and showing the work holding turret in elevation.

Each of the holders is attached to the casting 47 by a pair of shouldered bolts 51, upon each of which is pivotally mounted a lever 52 carrying vise jaws 53 adapted to grasp the shank of a bolt. The two levers 52 are provided with integral, intermeshing sectors 9, as shown particularly in Fig. 5, to insure equal movement. A small cylinder 54 is mounted between the bolts 51, being secured in position by means of perforated laterally extending lugs 55, Figs. 11 and 12, which surround the bolts 51 outside the levers 52. Each of the cylinders 54 has a plunger 56 therein attached to a stem 57 which protrudes through the end of the cylinder. The plunger 56 is provided with an extension 58 in the end of which is mounted a pin 59 adapted to engage with the head of the bolt. The plunger is urged forward into the position illustrated in Figs. 9 and 12 by a coil spring 60 within the cylinder. The plunger may be retracted by a sliding link 61 which has a perforated angularly arranged end portion surrounding the stem 57 and adapted to engage a nut 62 on the stem. A certain amount of lost motion is thus provided when the link 61 begins to move rearwardly before the nut 62 is engaged.

The rear end of link 61 is slotted, and through that slot extends one end of a pin 63. The pin serves also as the pivotal connection between a pair of toggle links 64 and 65, the link 65 being bifurcated to straddle the link 64. The pin 63 has a large head 66, provided as a convenient projection for engagement with the vise operating elements. At intermediate points in the toggle links 64 and 65, pivotal connections are made with the levers 52 by means of pins 67. The links 64 and 65 extend beyond these pivotal connections, however, and bear at their outer ends against the rounded ends of hollow plungers 68 which are slidably mounted in barrels 69, the latter being fixed in outwardly extending arms 70 on the levers 52. Within each of the barrels 69 and hollow plungers 68 is a coil spring 71 which acts to press the curved head of the plunger 68 firmly against the link 64 or 65, as the case may be, thereby tending to keep the links in substantially aligned positions and to spread the rear ends of the levers 52, causing the jaws 53 upon the forward ends of the levers to close. At the same time, the pin 63 is pushed forward, and this permits the spring 60 to advance the plunger 56, its extension 58 and the pin 59, the latter pressing upon the head of the bolt, indicated at $b$ in the drawings, thereby holding the head of the bolt against the sides of the jaws 53. The bolt is, therefore, definitely positioned by the three elements 53, 53 and 59. When the head 66 of the pin 63 is retracted, the springs 71 are compressed and the rear ends of the levers 52 are caused to approach each other, the jaws 53 being thereby moved to release the bolt. Before the movement proceeds far enough to withdraw the jaws beyond the head of the bolt, however, the link 61 has engaged the nut 62 and the stem 57 is retracted against the action of the spring 60 whereby the plunger 56 is retracted to withdraw the pin 59. Hence the endwise pressure upon the bolt is withdrawn before the jaws 53 release it completely, and consequently, the bolt merely drops by the force of gravity. In the reverse movement of the bolt holding parts, the pin 59 acts to advance the bolt against the sides of the jaws 53 before the latter close upon the bolt and grip it too tightly to be affected by the pin 59.

The shaft 37 upon which the turret G is fixed has intermittent longitudinal and rotational movements, that is to say, it moves to the rear to a predetermined position, rotates one-fourth of a revolution, then moves forward rapidly through the greater portion of that stroke and then slowly to the predetermined forward position, the bolt pointing being performed during such slow movement, and remains in the forward position for an interval sufficient to have the other working operations performed upon the bolts or blanks, after which the cycle of movements is repeated. The longitudinal movements of the shaft 37 are brought about by a suitably formed cam groove 72 in the cylinder 46, which acts through a follower 73 attached to a sleeve 74 rotatably mounted on the shaft 37. The sleeve 74 is held against longitudinal movement with respect to the shaft 37 by two collars 75 secured to the shaft on opposite sides of the sleeve. The sleeve is maintained in a given angular position by a laterally extending arm 76 which is provided with an opening to slidably fit upon a shaft 77 that is fixed in the frame members B and C. The rotational 90° movements of the shaft 37 result from the movements of the star wheel 36 previously described.

Bolt blanks are shovelled or otherwise delivered into the hopper D which may be provided with any suitable mechanism for starting the blanks down a gravity chute 78, such mechanism being driven in any suitable manner, as by a belt 79 driven from a transverse shaft 80 operatively connected with the motor shaft 21 as by worm gears (not shown) mounted within a gear casing 81. The nut hopper F may also be supplied with suitable mechanism for starting the nuts down a chute 82, the chute being adapted, of course, to maintain them in single file.

The head E of the machine is longitudinally adjustable in the bed of the machine, as previously stated, the adjustment being effected preferably by means of a heavy screw 83 threaded into an opening in the head, this screw being rotatably mounted in a bracket 84 secured to the bed of the machine and held against longitudinal movement by collars 85. If desired, the head may be locked in any adjusted position by means of a longitudinally movable wedge 86 having a laterally deflected extremity 87 receiving an adjusting screw 88 similar to the screw 83 but threaded into the bed of the machine.

A bracket 89 is secured to the bed A by bolts 90 and has a slotted arm 8 for connection with the head E of the machine in its various positions of adjustment. The bracket 89 carries the blank transfer apparatus, that is to say the means for grasping the blank at the delivery end of chute 78, withdrawing it and transferring it into a position to be gripped by one of the blank holders or vises on the turret G. The lower end of the chute 78 is attached to the bracket 89 by suitable means. This bracket carries a slidable and rotatable shaft 91 upon which is fixed a radial arm 92 which carries a transfer finger 93. The latter comprises a shank 94 clamped in the arm 92 by a bolt 95 and a pair of grip fingers 96 resiliently drawn toward the shank 94 by a coil spring 97 surrounding a pin 98 which extends through aligned openings in the shank and two grip fingers. The shank 94 has a concave extremity to fit the shank of the bolt to be grasped, and the fingers 96 extend a short distance therebeyond and are beveled so as to be cammed over the sides of the bolt as the transfer finger moves toward the bolt.

Near its outer extremity the shaft 91 is provided with an annular groove for cooperation with the forked end of a crank arm 99, by means of which longitudinal movement is imparted to the shaft 91. The crank arm 99 is pinned to a shaft 100 mounted in a bearing upon the bracket 89, and in a second bearing upon a bracket 101 near the rear end of the machine. Beyond the bracket 101, the shaft 100 carries a crank arm 102 that is adapted to be swung through a link 103 from a lever 104 pivoted at 105 to the frame member C of the machine and provided with a follower 106 which runs in a cam groove 106' (see Fig. 14) in the end surface of the cylinder 46. The cam groove 106' has two portions formed in the arcs of a large circle, whereby the shaft 91 carrying the transfer finger is maintained in its outer position for two portions of each revolution of the cam cylinder, that is while the finger is swinging down and up. The groove also has two other portions formed upon arcs of a smaller circle intermediate the first named arcs for the purpose of holding the transfer finger in its inner position for short periods. The remaining portions of the cam groove, that is the portions joining these arcs of circles, are responsible for the in and out movements of the transfer finger.

On the shaft 91 there is a gear sector 107 which may be formed integral with the hub of arm 92. The teeth of sector 107 mesh with the teeth of a sector 108 in the end of a lever 109 pivoted at 110 to the bracket 89. One of these sectors is made relatively thick in order to permit the movement of the sector 107 longitudinally with its shaft 91 without disengagement of the teeth of the two sectors. The lever 109 is caused to swing upon its pivot 110 by a rod 111 pivoted to the lower end of lever 109 and to the end of a crank arm 112 which is fixed upon a short shaft 113 carrying on its inner end a crank arm 114. A follower 115 is supported in the outer end of arm 114 and runs in a cam groove 116 in the cylinder 46. This groove is so designed as to shift the lever 109 from one extreme position to the other and back again during each revolution of the cam cylinder and to maintain it in each of the extreme positions for a certain period, the parts being timed so that the swinging of the lever 109, and consequently of the transfer finger, takes place while the crank arm 99 is held stationary in its outer position. When the arm 92 is held vertical and moves inwardly, the grip fingers 96 automatically operate to grasp the shank of the blank at the bottom of the chute 78. The transfer finger then travels outward, swings down from the position illustrated in Fig. 5 to the horizontal position illustrated in Fig. 1, then travels inward and holds the blank momentarily in a position where it can be grasped by one of the bolt holding vises, and thereafter returns through a reverse series of movements to its first named position.

The two angular positions of the transfer finger are, of course, determined by the operation of the lever 109 through the cam groove 116, but in order that these positions may be determined with accuracy, we provide two guides 117 and 118 mounted upon the bracket 89, these guides being provided with flaring mouths and being adapted to direct the transfer finger inwardly with precision to definite angular positions, in this case vertical and horizontal.

Prior to the time when the transfer finger reaches its inward position, the shaft 37 travels forward, carrying with it the turret G with its four blank holding vises. That vise which is furthest toward the front of the machine at the time is empty. Just prior to the inward travel of the transfer finger furthermore, the vise is opened by a hook on the end of a slide 119 engaging with the projection 66 of the device, this slide being caused to travel rearwardly by a pinion 120 meshing with a rack cut into the bottom side of the slide, as indicated by dotted lines in Fig. 5. The pinion 120 is fixed to a shaft 121 that is mounted in the frame member B and is adapted to be rocked in its bearing by a crank arm 122. The latter is connected by a link 123 with a crank 124 on a short shaft 125 mounted in the machine frame. This shaft on its inner end carries a crank arm 126 in which is mounted a follower 127 that runs in a cam groove 128 of the cylinder 46. The latter groove is so designed that the jaws of the vise remain open while the transfer finger is positioning the bolt blank, after which the slide 119 moves forwardly and the vise jaws 53 and pin 59 move into bolt gripping position. The transfer finger then moves outwardly, its gripping fingers 96 automatically riding off the shank of the blank and leaving it in the grip of the vise.

The turret G now travels backwardly to the position illustrated in Fig. 5 and then rotates in a clockwise direction, as viewed from the head end of the machine, carrying the vise in question down to its position below the axis of shaft 37. In this position, the blank is in alignment with the trimming station. At this station there is a constantly rotating spindle 129 having bearing in a sleeve 130 which is adjustable lengthwise and provided with a radially arranged stud 131 extending through a slot in the head E of the machine and provided with a nut 132 by means of which the parts may be locked in any desired position of adjustment. The spindle 129 protrudes through the forward end of the sleeve 130 where it carries the pinion 42, the teeth of the latter pinion being wide enough to remain in mesh with the teeth of gear wheel 27, regardless of the longitudinal adjustment of the spindle 129. The opposite end of the spindle is threaded for the reception of a pointer head 134. The outer end of the head is axially drilled to receive a removable guide bushing 135 having an opening to slidably fit the shank of the blank to be pointed. Bushings to fit blanks of different diameters may readily be substituted. The head 134 has mounted therein a cutting tool 136 which is adapted to point the blank by a turning operation. The operation is performed as the vise moves the blank forward, and as the extent of the forward movement is always the same, the length to which the blank is trimmed is determined by the adjustment of the head E and the setting of the sleeve 130.

The vise is then retracted and rotated 90° to bring it up to the level of the shaft 37 on the rear side of the machine, where it is in alignment with the third station, this being the station where the blank is rolled between dies to impress identifying marks into the shank as well as to thread the same.

In the head of the machine, there is mounted in anti-friction bearings 137 and 138 a shaft 139 which carries at the head end of the machine the gear 39 previously mentioned. On the inner end of the shaft 139 there is mounted a die carrier 140 in the form of a disk. The driving connection is by means of a key 141 set into transverse slots in the shaft and disk and held in place by screws 142.

Figure 8:
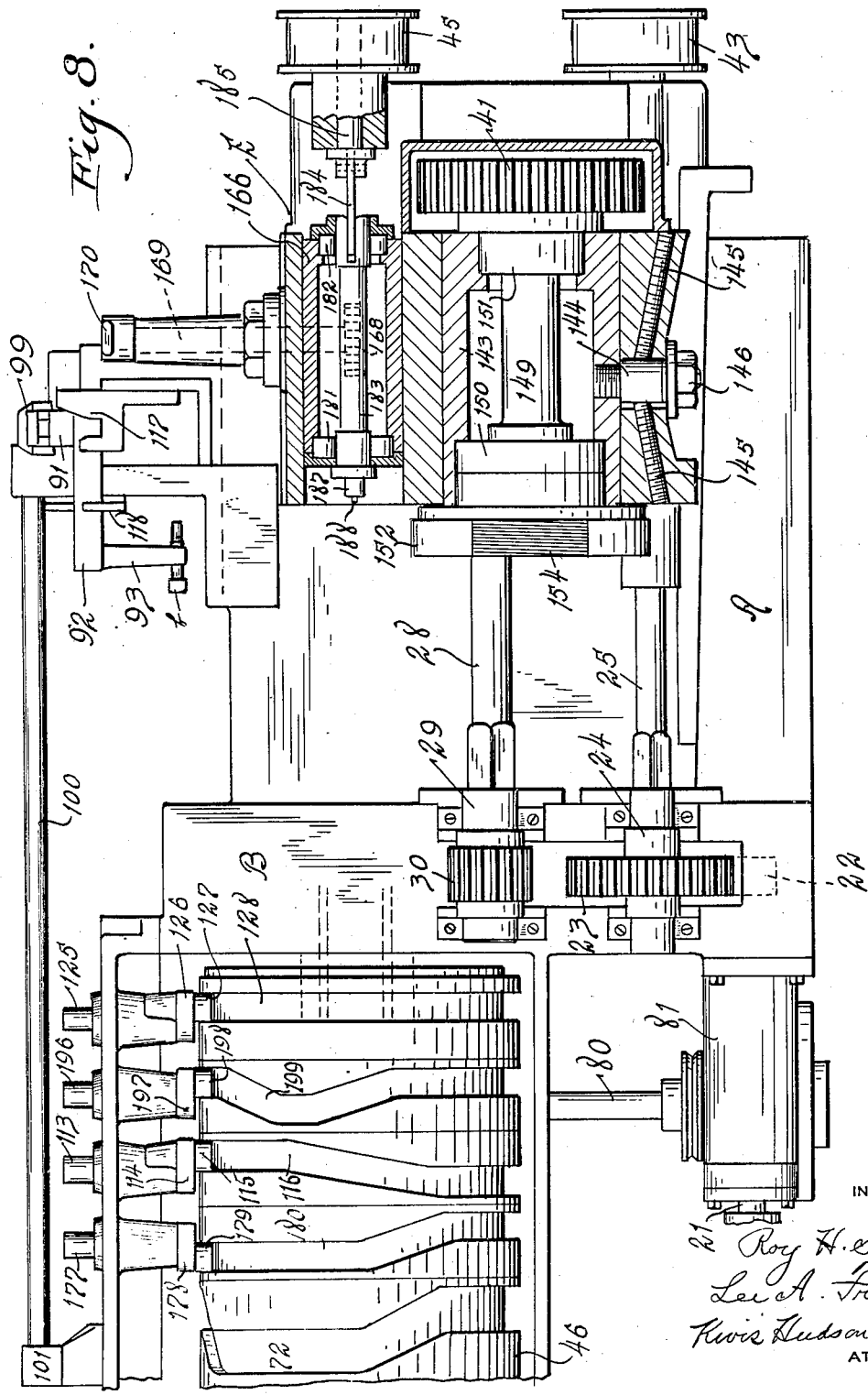
Fig. 8 is a plan view partially in section on the line 8—8, Fig. 6.

In the head above the shaft 139 is a slide block 143 which has a limited adjustment both horizontally and vertically. The means for accomplishing the horizontal adjustment is illustrated in Fig. 8 where there is shown a stud 144 threaded into the block 143 and extending out through a slot in the casing. This stud is movable in opposite directions by means of adjusting screws 145, and after adjustment may be locked in position by a clamping nut 146. The block 143 is held in a desired vertical adjustment by means of a wedge block 147 movable transversely of the head by adjusting screws 148 (see Fig. 6). A shaft 149 similar to the shaft 139 is mounted in the block 143 by means of anti-friction bearings 150 and 151, which may be duplicates of the bearings 137 and 138. Beyond the head end of the machine, the shaft 149 carries the gear 41 previously referred to. On the inner end of the shaft 149 there is a second die carrier 152 which may be identical with the carrier 140 and may be attached to its shaft in identically the same manner.

The disks or carriers 140 and 152 support complementary threading dies 153 and 154. These dies are removably held in position by screws 155. Their operative faces extend but a short distance radially beyond the peripheries of the disks. The disk 152 also has mounted therein a marking die 156, which may be employed for impressing into the shank of the bolt marks of any desired kind, as for instance size or grade marks or the trade mark of the manufacturer. In the proper position in the disk 140 to cooperate with the marking die 156, we mount an anvil 157, this die and anvil being positioned in the disks 140 and 152 somewhat in advance of the dies 153 and 154, that is with respect to the direction of rotation of the disks, so that the contact of the dies 156 and 157 with the blank takes place before the latter is threaded by the dies 153 and 154.

Figure 6:
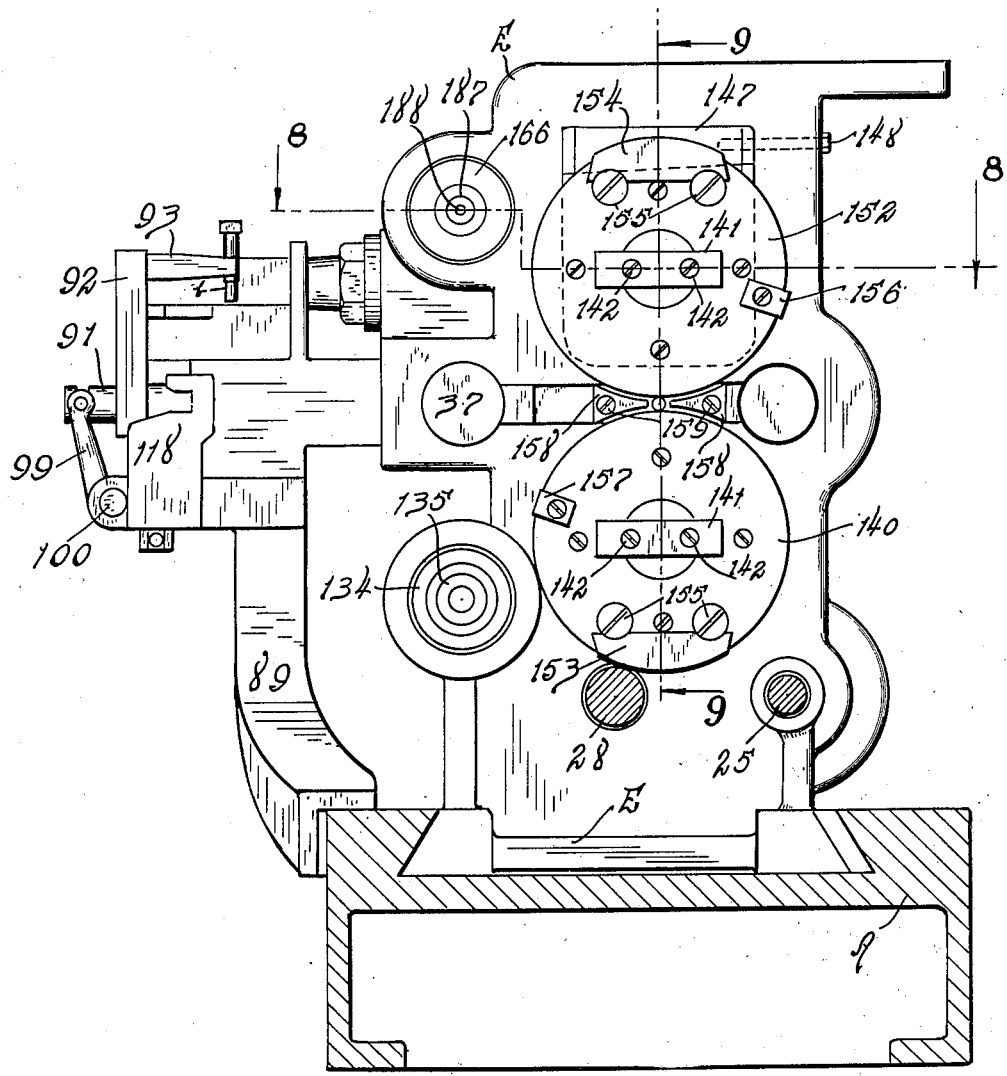
Fig. 6 is a transverse vertical section taken substantially on the line 6—6, Fig. 2, showing the head end of the machine in elevation.
Figure 7:
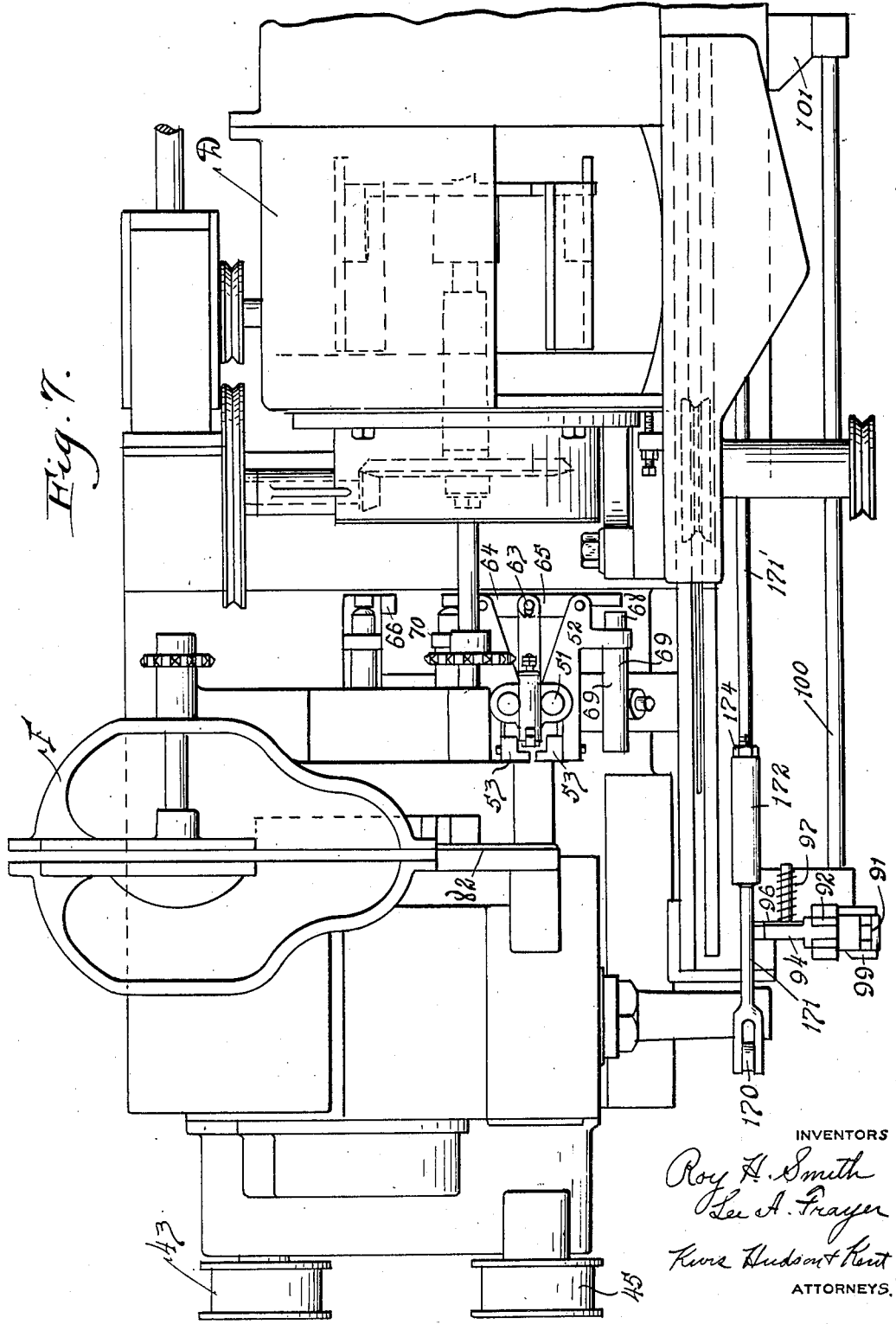
Fig. 7 is a plan view of the greater portion of the machine.

In order to guide and laterally support the blanks during the rolling operation, we mount in the inner face of the machine head a pair of horizontally adjustable blocks 158 that are cut out, as shown in Fig. 6, to clear the disks and dies. Screws 159 are provided for holding these blocks in adjusted position. In alignment with the opening between the blocks 158 there is a push rod 160 working in a drilled passage through the head. A coil spring 161 in a counterbore works against a collar 162 on the rod 160 to hold it normally in the position illustrated in Fig. 9, a ring 163 threaded into the head serving as a stop to prevent further motion. The head of the rod 160 is adapted to be engaged at a certain time in the revolution of the disks by a cam sector 164 on the rear face of gear 41, whereby the rod 160 is pushed toward the left in Fig. 9.

When the vise supporting the blank moves forward, the blank is pushed into the space between the blocks 158, but just before it reaches its final position, the projection 66 of the vise engages a fixed hook 165 (see dotted lines, Fig. 1) mounted in the frame member B, thereby swinging the toggle levers 64, 65 of the vise sufficiently to relieve the pressure of jaws 53 upon the blank, but not sufficiently to retract the link 61, rod 57 and pin 59. Consequently, the blank is free to turn in the jaws 53 and between the blocks 158, but is held against longitudinal movement. The die carriers, rotating in the directions indicated by arrows in Fig. 6, bring the die and anvil 156 and 157, respectively, into engagement with the blank simultaneously, and the marking of the same is thereby accomplished. Immediately thereafter the cam 164 engages the rod 160 and pushes it inward. The rod 160 thus pushes against the end of the blank and moves it backward against the force of spring 60 a sufficient distance to move the marked part of the blank beyond the range of action of the dies. The spring 60, however, holds the blank against the end of rod 160, and, therefore, its longitudinal position is accurately determined. The threading dies 153 and 154 then come into engagement with the blank, rolling the latter sufficiently to impress the threads into the blank throughout its periphery. The cam 164 then disengages the rod 160, and the spring 161 thereupon returns the rod to its normal position. The vise is now retracted, the first part of its rearward movement serving to disengage the projection 66 from the hook 165, whereby the springs 71 again bring the toggle link 64, 65 into approximate alignment and cause the jaws 53 to again grip the threaded bolt.

Figure 3:
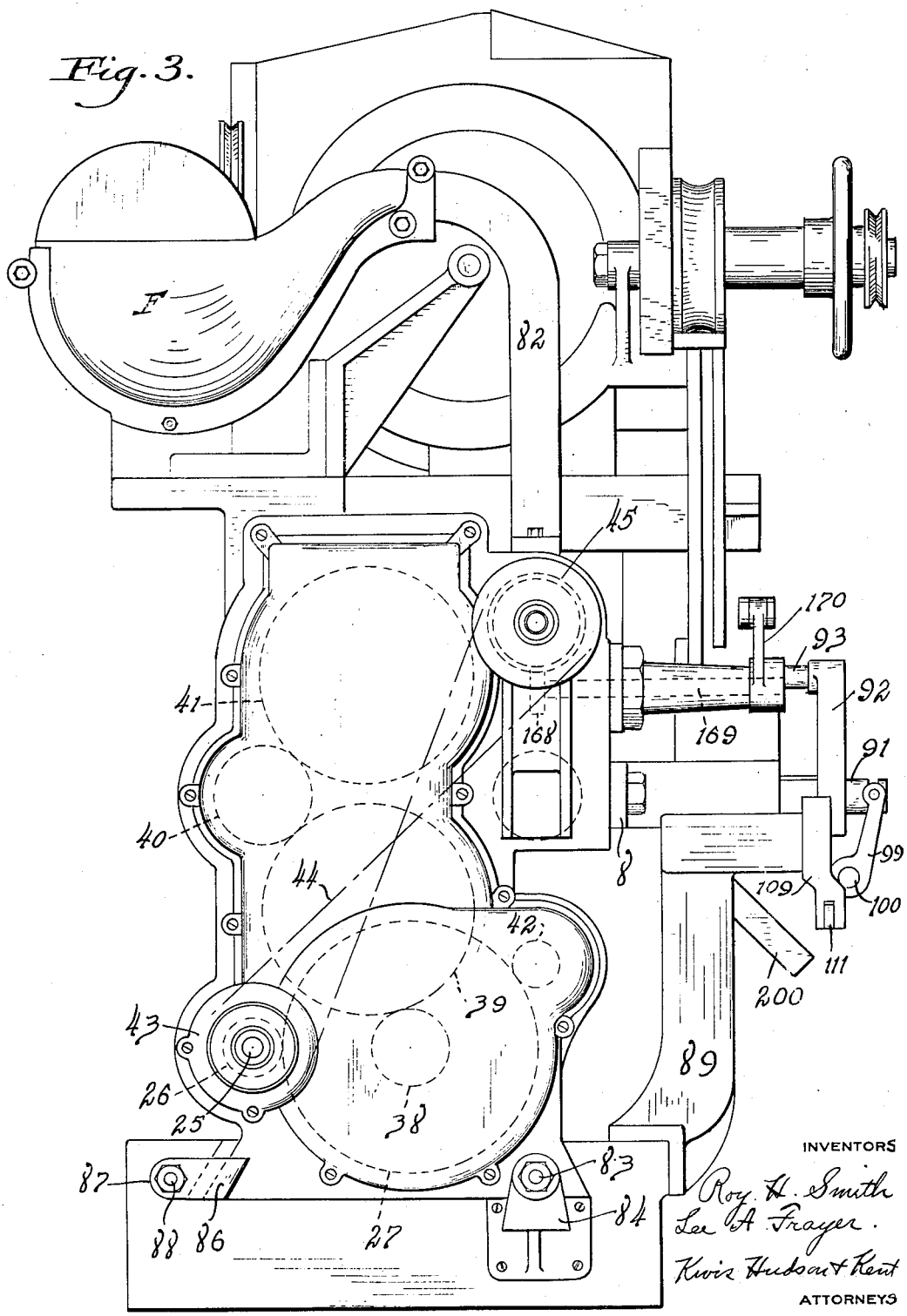
Fig. 3 is an elevation of the head end of the machine.
Figure 4:
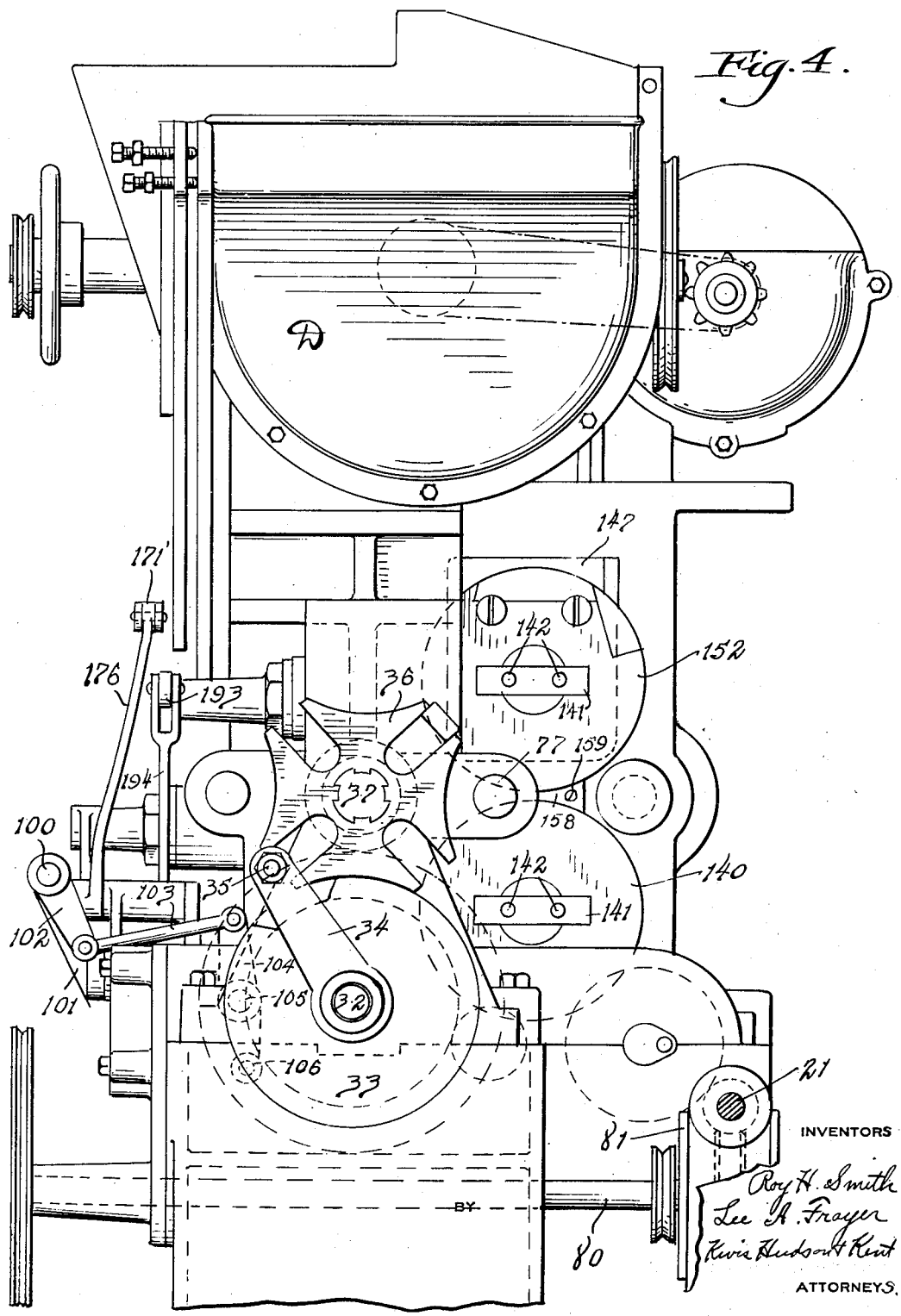
Fig. 4 is an elevation of the foot end of the machine.

After the completion of its rearward movement, the turret is again rotated 90° and now comes into a position directly above the shaft 37, this being the nutting and discharging position. Referring to Figs. 18, 19 and 20, 166 is a longitudinally movable barrel in the under side of which is cut a rack 167. This rack is engaged by a pinion 168, indicated in dotted lines in Fig. 3, this pinion being mounted upon a shaft 169 supported in suitable bearings carried by the head of the machine. A crank 170 is attached to the outer end of the shaft 169 and is adapted to be oscillated by a rod 171, to which is attached a sleeve 172. (See Fig. 5).

Slidably arranged within the sleeve is a plunger 173 which is secured upon one end of a rod 171' which slides through a hollow plug 174 in the end of sleeve 172. A coil spring 175 surrounds rod 171' within the sleeve 172 and bears at one end upon the head 173 and at the other end upon the plug 174, thereby tending to maintain the two rods 171 and 171' in telescoped position. The spring 175 is relatively strong and transmits to the rod 171, without flexing to any considerable extent, most of the force imparted to it by the rod 171'. The latter rod is connected at its opposite end to a crank arm 176 mounted upon a rock shaft 177, at the inner end of which is a crank 178 carrying a follower 179 which runs in a cam groove 180 in the cylinder 46.

Figure 5:
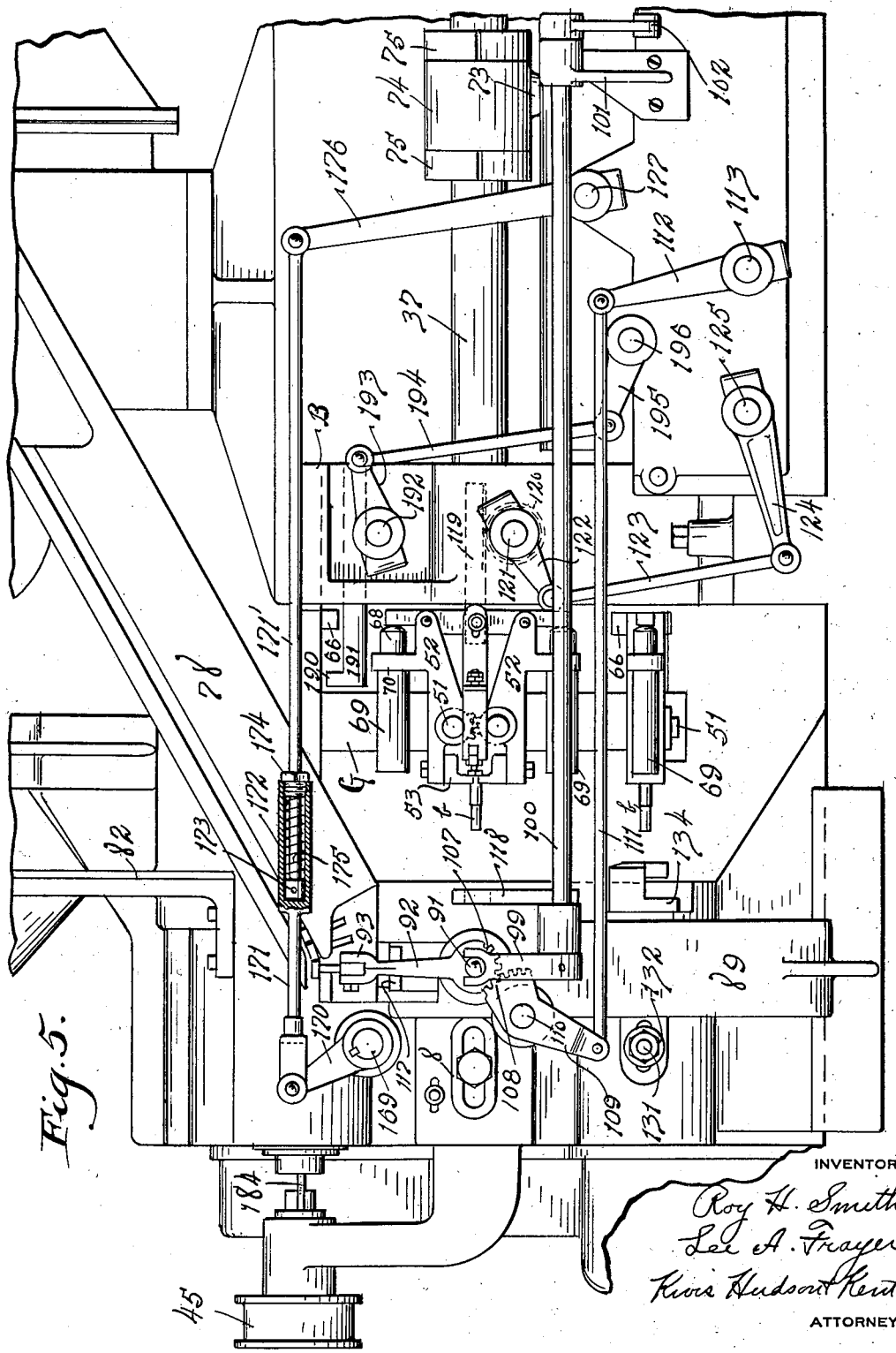
Fig. 5 is an elevation of a portion of the front side of the machine.

At the proper time in the cycle of operations of the machine, the rod 171, 171' moves to the right, as viewed in Fig. 5, and rocks shaft 169 to produce travel of barrel 166 inwardly. If there should be a slight deviation from the desired rate of travel of the barrel 166, or the time of beginning that travel, to properly effect the driving of a nut onto the bolt, such deviation is compensated or absorbed by the spring 175.

At the ends of the barrel 166, there are mounted anti-friction bearings 181 and 182 in which rotates a spindle 183, that is slotted to slidably receive a driving plate 184 pinned to a short shaft 185 upon which the pulley 45 is mounted. By means of this slip coupling, the rotation of the spindle 183 is made continuous despite the longitudinal movements of the spindle produced by the travel of the barrel 166. The inner end of spindle 183 is provided with a Morse taper which removably receives a socket member 186. The exposed end of the socket member is internally threaded to take a nut driver 187 of cylindrical form having an opening corresponding approximately to the diameter of the bolts being handled. The outer end of the driver 187 is serrated or otherwise roughened in order to make good frictional contact with the nut to be driven. A pin 188, headed on its inner end, is slidably mounted in the driver 187 and normally protrudes therefrom, a coil spring 189 in the socket member 186 serving to yieldably hold the pin in its outermost position. The driver 187 and pin 188 may be replaced by similar parts of different sizes where bolts of different diameters are to be handled upon the same machine.

The barrel 166 stands during the greater part of the time in the position illustrated in Fig. 8 where the pin 188 is just inside of the face of the machine head. The nut chute 82 is so mounted as to feed nuts one at a time down just in front of this face and into a position in alignment with the pin 188 and the bolt in the corresponding vise. The rod 171, 171' is then pulled through the operation of the cam groove 180 and the barrel 166 is fed gradually inward. The pin 188 is thus projected through the hole in the lowermost nut. The pin continues to advance until it encounters the bolt in alignment therewith, whereupon the movement of the pin stops and further travel of the sleeve 166 causes the spring 189 to be compressed, while the driver 187 travels over the pin 188 until it engages the nut. Thereupon the driver 187, which is continuously rotating, threads the nut onto the bolt for a predetermined distance. This driving of the nut takes place while the corresponding vise is standing still in its forward position. Immediately afterward the driver 187 is quickly retracted. Then a hook 190 on a slide bar 191 engages the projection 66 of the vise, opening the jaws 53 and retracting the pin 159 to release the bolt and nut assembly. The movement of the slide bar 191 is effected by a rack and pinion mechanism, the rack being cut into the under side of the slide bar and engaged by a pinion on a rock shaft 192 which is rotatably mounted in the frame member B of the machine. This shaft is provided with a crank arm 193 that is pivotally connected to a link 194, the latter being pivotally connected to a crank 195 on a rock shaft 196 mounted in the base of the machine. On the inner side of the shaft 196 is a crank 197 carrying a follower 198 that runs in a cam groove 199 on the cylinder 46. When the bolt and nut assembly is thus released by the vise, it falls into a chute 200 that is C-shaped in cross-section, that is to say the nut falls into the chute and the shank of the bolt extends outwardly through the opening in the side of the chute. If, for any reason, no nut is on the bolt, gravity acting upon the relatively heavy head of the bolt pulls the latter out of the chute and it falls into a receptacle provided for the purpose. If, on the other hand, a nut without a bolt is dropped into the chute, it travels down the latter until it encounters an opening 201 in the bottom side of the chute, when it falls therethrough into a second receptacle provided for that purpose. Only complete bolt and nut assemblies travel the full length of the chute, and these are delivered into a suitable container or onto a suitable conveyor, not shown.

An illustration of a bolt blank, such as the machine is intended to act upon, will be found in Fig. 26. The completed blank and nut assembly is shown in Fig. 27. The operation of the various parts of the machine has been stated above in connection with the description of the parts. It will be observed that the four operating stations of the machine all function simultaneously with each forward travel of the turret B. Hence there is a complete bolt and nut assembly delivered for each forward travel. In preparing the machine for a run on bolts of a given length and diameter, the head of the machine is adjusted to the proper position lengthwise of the machine bed, gripping jaws 53 of the proper size are mounted in the four vises, a shank 94 for the transfer finger suited to the diameter of the bolt is selected and mounted, a guide bushing 135 with an internal opening of proper size is selected and mounted, the barrel 130 of the pointer spindle is carefully adjusted to produce the correct length of the bolt, dies 153 and 154 of the proper character are selected and mounted, the blocks 158 are adjusted in accordance with the diameter of the bolt, and the slide block 143 is adjusted to provide the desired spacing of the dies. No other changes in the machine are necessary.

The invention has been described with considerable particularity in order to provide a full disclosure of the embodiment herein illustrated, but it will be obvious to those skilled in the art that various changes and modifications may be resorted to without departing from the spirit of the invention. Hence it is to be understood that the details found in the present disclosure are not to be construed as limiting the scope of the invention.

Having thus described our invention we claim:

1. In a machine of the class described, means for grasping a bolt, means for moving said grasping means step by step from one operating station to another and for moving it lengthwise in opposite directions at each of said stations, in combination with timed means for pointing the bolt at one station and rolling a thread thereinto at another station, and means for relieving said grasping means slightly at said threading station to permit rotation of the bolt.

2. In a machine of the class described, means for grasping a bolt, means for moving said grasping means step by step from one operating station to another and for moving it lengthwise in opposite directions at each of said stations, and finally releasing it, in combination with means for pointing the bolt at one station and rolling a thread thereinto at another station, and means for relieving said grasping means at said last named station to permit rotation of a bolt during the threading operation.

3. In a machine of the class described, means for grasping a bolt, means for moving said grasping means step by step from one operating station to another and for moving it lengthwise in opposite directions at each of said stations, in combination with means for pointing the bolt at one station, rolling a thread thereinto at a second station, threading a nut thereonto at a third station, and means at said second station only for relieving said grasping means slightly to permit rotation of the bolt during the threading operation.

4. In a machine of the class described, means for grasping a bolt, means for moving said grasping means step by step from one operating station to another and for moving it lengthwise in opposite directions at each of said stations, in combination with means for pointing the bolt at one station, rolling a thread thereinto at another station, relieving the action of said grasping means at the last named station in order to permit rotation of the bolt at said station, threading a nut onto the bolt at a third station, and releasing the bolt at said third station after said nut applying operation is completed.

5. In a machine of the class described, means for grasping a bolt and moving it step by step from one operating position to another, in combination with means for pointing the bolt at one station, rolling a thread thereinto at another station, threading a nut thereonto at a third station, releasing the bolt after said nut applying operation is completed, and a chute for receiving said bolts with nuts applied thereto, said chute being adapted to drop short of its delivery end bolts or nuts fed thereto singly.

6. In a machine of the class described, means for grasping a bolt, means for applying a nut thereto, means for releasing the bolt, and a chute for receiving the complete bolt and nut assemblies, said chute being adapted to hold the assemblies by the nuts and to drop short of its delivery end bolts or nuts fed thereto singly.

7. In a machine of the class described, a transfer finger, a shaft to which said finger is attached to one side of the axis of said shaft, means for moving said shaft axially and rotatably, and means engaging the finger during an axial movement thereof for guiding it into a definite angular position at the end of such movement.

8. In a machine of the class described, a transfer finger, a shaft to which said finger is attached to one side of the axis of said shaft, means for moving said shaft axially and rotatably, and a pair of guides angularly spaced around said shaft for guiding the axial movements of the shaft and finger in two different angular positions.

9. In a machine of the class described, a sleeve, means for supporting a bolt in front of said sleeve in axial alignment therewith, means for feeding a nut into axial alignment with said sleeve and bolt within the space between the same, and means for producing simultaneously relative rotary and reciprocatory movements between said sleeve and bolt.

10. In a machine of the class described, a longitudinally slidable barrel, a spindle rotatably mounted therein, a sleeve attached to one end of said spindle, means for supporting a bolt in front of said sleeve in axial alignment therewith, means for feeding a nut into axial alignment with said sleeve and bolt in the space therebetween, means for rotating said spindle permitting longitudinal movement thereof, and means for reciprocating said barrel.

11. In a machine of the class described, a rotating sleeve, a pin slidable in said sleeve and resiliently held in a position projecting therebeyond, means for supporting a bolt in front of said pin in axial alignment therewith, means for feeding a nut into axial alignment with said pin and bolt in the space between the same, and means for producing relative axial reciprocation between said bolt and sleeve.

12. In a machine of the class described, a sleeve, a pin slidable in said sleeve and resiliently held in a position projecting therefrom, means for supporting a bolt in front of said pin in axial alignment therewith, said pin being adapted to receive a nut for said bolt, and means for producing relative rotation between said sleeve and bolt as they are caused to approach each other.

13. In a machine of the class described, a nut driver comprising a sleeve with an inner diameter approximating the inner diameter of the nut to be driven, and having an end face adapted to frictionally engage the nut, and a pin in said sleeve adapted to slidably fit within the nut, said pin normally projecting from said sleeve and adapted to support a nut during the initial portion of the driving operation and to recede in response to pressure communicated to it by the end of the bolt receiving the nut.

14. In a machine of the class described, a nut driver comprising a sleeve with an inner diameter approximating the inner diameter of the nut to be driven, and having an end face adapted to frictionally engage the nut, a pin in said sleeve adapted to slidably fit within the nut, said pin normally projecting from said sleeve and adapted to support a nut during the initial portion of the driving operation and to recede in response to pressure communicated to it by the end of the bolt receiving the nut, and a chute for feeding nuts one at a time into position in alignment with said pin, whereby forward movement of the sleeve and pin will cause the latter to remove a nut from said chute.

15. In a machine of the class described, means operated in properly timed relation for presenting a bolt, driving a nut onto said bolt and releasing the bolt and nut assembly, and a chute positioned to receive the nut of the assembly, said chute having a slot through which the shank of the bolt projects.

16. In a machine of the class described, means operated in properly timed relation for presenting a bolt, driving a nut onto said bolt and releasing the bolt and nut assembly, and a chute positioned to receive the nut of the assembly, said chute having a side slot through which the shank of the bolt projects, and a bottom opening of a size sufficient to discharge nuts alone.

17. In a machine of the class described, a sleeve, means for supporting a bolt in front of said sleeve in axial alignment therewith, means for feeding a nut into axial alignment with said bolt and sleeve in the space therebetween, means for producing relative rotation between said bolt and sleeve, and means for producing relative movement of said bolt and sleeve toward each other, said last named means comprising a yieldable element.

18. In a machine of the class described, a bolt holder comprising a pair of jaws adapted to grasp the shank of the bolt beneath the head thereof and to open sufficiently to clear the head, and a pin adapted to engage the head of the bolt and press it against said jaws.

19. In a machine of the class described, a bolt holder comprising a pair of jaws adapted to grasp the shank of the bolt beneath the head thereof, a pin adapted to engage the head of the bolt and press it against said jaws, and means acting in timed relation in the order named for causing said jaws to move inwardly toward the shank of the bolt beneath the head thereof, for causing said pin to press the head of the bolt against the sides of said jaws and for continuing the inward movement of the jaws to firmly grasp the shank of the bolt.

20. In a machine of the class described, a bolt holder comprising a pair of jaws adapted to grasp the shank of the bolt beneath the head thereof, a pin adapted to engage the head of the bolt and press it against said jaws, spring means for urging said jaws and pin toward operative position, a retracting means for said jaws and pin, and a slip connection in said retracting means permitting said pin to advance to operative position before said jaws grip the bolt.

21. In a machine of the class described, a bolt holder comprising a pair of bolt gripping jaws mounted upon pivoted levers, a pair of toggle links connecting said levers, a pair of springs carried by said levers bearing upon said links, and means at the joint between said links for swinging the same against the action of said springs and thereby moving said levers.

22. In a machine of the class described, a rotatably and axially movable turret, a series of bolt holders mounted upon said turret, said holders comprising means movable parallel to the axis of the turret for opening and closing the bolt holders, and a fixed projection upon the machine adapted to engage said means as the turret moves axially.

23. In a machine of the class described, a rotatably and axially movable turret, a series of bolt holders mounted on said turret in spaced relation around the axis thereof, each of said holders comprising means movable parallel to the axis of the turret for opening and closing the bolt holders, a projection upon said machine, means for rotating said turret intermittently to bring each of said first-named means successively into longitudinal alignment with said projection, and means for reciprocating said turret between successive rotating movements.

24. In a machine of the class described, a rotatably and axially movable turret, a series of bolt holders mounted on said turret in spaced relation around the axis thereof, means for rotating said turret intermittently through an angle equal to the angle between adjacent bolt holders, means for reciprocating said turret between successive rotating movements, a fixed guide member on said machine, and a series of complemental guide members on said turret equal in number to the number of said bolt holders, adapted to cooperate with said fixed guide member during the axial reciprocations of the turret.

25. In a machine of the class described, means for positioning a bolt, means for rolling insignia into the shank thereof, means for moving the bolt endwise, and means in the same plane as said first named means for rolling threads thereinto.

26. In a machine of the class described, a pair of discs mounted for rotation in the same plane with their peripheries in proximity to each other, means for rotating said discs in the same direction, threading dies carried by said discs in angular positions, such that the dies pass each other as they cross the line of centers of said discs, a marking die and anvil carried by said discs and positioned to pass each other in crossing said line of centers, means for positioning a bolt between said discs and rotatably mounting it upon an axis at right angles to said plane, and means for moving said bolt axially after being engaged by said marking die and anvil in order to present different surfaces to said threading dies.

27. In a machine of the class described, a pair of discs mounted for rotation in the same plane with their peripheries in proximity to each other, means for rotating said discs in the same direction, threading dies carried by said discs in angular positions, such that the dies pass each other as they cross the line of centers of said disc, a marking die and anvil carried by said discs and positioned to pass each other in crossing said line of centers, and means for positioning a bolt between said discs and rotatably mounting it upon an axis at right angles to said plane, yieldable means engaging the head of the bolt tending to hold it against longitudinal movement, a rod opposite said yieldable means in axial alignment with the bolt, and means operating after said marking die has passed over the bolt for moving said rod against the action of said yieldable means, whereby the bolt is shifted to present a new surface to said threading dies.

28. In a machine of the class described, a pair of relatively movable die holders carrying threading dies and a marking die and anvil, and means for rotatably supporting a bolt in position to be engaged by said threading dies and marking die and anvil whereby one pass of the die holders threads a bolt and imprints identifying marks thereon.

29. In a machine of the class described, means for grasping a bolt, means for applying a nut thereto, means for releasing the bolt, and a chute for receiving the nut end of the complete bolt and nut assemblies, said chute being C-shaped in cross section and provided with an opening in its lower side for the discharge of separate nuts.

30. In a machine of the class described, a bolt holder comprising bolt positioning and grasping means, including a pair of jaws adapted to grasp the shank of the bolt beneath the head thereof and to open sufficiently to clear the head for the reception and discharge of the bolt longitudinally, and a pin aligned with the bolt adapted to engage the head thereof and press it against said jaws.

31. In a machine of the class described, a bolt holder comprising a pair of jaws adapted to grasp the shank of the bolt beneath the head thereof, a pin aligned with the bolt adapted to engage the head thereof and press it against said jaws, and means for actuating said pin in advance of the completed movement of said jaws.

32. In a machine of the class described, a head having a plurality of stations, means at each of said stations for performing an operation upon a bolt, bolt holding means on the machine for presenting a bolt endwise to each of said stations in succession, said means being adapted to hold the bolt rigidly when presented to certain of said stations and to permit free rotation thereof when presented to certain other of said stations.

33. In a machine of the class described, means for rotatably supporting a bolt at a given position along an axis of rotation, means for rolling insignia into the shank thereof, means for moving the bolt a short distance along said axis to expose a new surface, and means for rolling threads thereinto.

34. In a machine of the class described, two disc-shaped die carriers mounted in the same plane to turn about parallel axes, means for rotating said carriers in the same direction, a die in each of said carriers projecting from the periphery thereof, said dies being positioned to pass each other as they cross the line of centers of said carriers, and timed means for projecting a bolt blank into the space between said carriers before said dies begin to cross the line of centers and for removing the threaded bolt after said dies have passed beyond said line of centers.

35. In a machine of the class described, a longitudinally slidable barrel, a spindle rotatably mounted therein, a sleeve attached to one end of said spindle, means for supporting a bolt in front of said sleeve in axial alignment therewith, means for feeding a nut into axial alignment with said sleeve and bolt in the space therebetween, means for rotating said spindle permitting longitudinal movement thereof, and means for reciprocating said barrel, said last named means comprising a resilient connection, whereby the pressure of the sleeve upon the nut is automatically relieved until the nut is started upon the bolt.

36. In a machine of the class described, means rotating about fixed centers for rolling threads into a blank, a blank holding turret, means for rotating the turret to bring blanks into alignment with said thread rolling means, and means operative between turret rotations for advancing and retracting a blank axially into and out of operative relation with said thread rolling means.

37. In a machine of the class described, means for rolling threads into a bolt blank, said means having threading movements only, a blank holding turret, means for rotating the turret to bring blanks into alignment with said thread rolling means, and means operative between turret rotations for advancing and retracting a blank axially into and out of operative relation with said thread rolling means.

38. In a machine of the class described, a blank transfer finger adapted to releasably grasp the shank of the blank, means for swinging said finger to move the blank in its own plane through a predetermined arc, and means for advancing and retracting said finger in a direction at right angles to said plane at both ends of said arc.

In testimony whereof, we hereunto affix our signatures.

ROY H. SMITH.
LEE A. FRAYER.